United States Patent
Kwon et al.

(10) Patent No.: US 9,272,707 B2
(45) Date of Patent: Mar. 1, 2016

(54) CONTROL APPARATUS AND CONTROL METHOD OF HYBRID ELECTRIC VEHICLE

(71) Applicants: Hyundai Motor Company, Seoul (KR); Kia Motors Corporation, Seoul (KR)

(72) Inventors: Gi Young Kwon, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/447,091

(22) Filed: Jul. 30, 2014

(65) Prior Publication Data

US 2015/0175156 A1    Jun. 25, 2015

(30) Foreign Application Priority Data

Dec. 23, 2013  (KR) .................. 10-2013-0161443

(51) Int. Cl.
- *B60W 10/02* (2006.01)
- *B60W 10/04* (2006.01)
- *B60W 20/00* (2006.01)
- *B60W 10/08* (2006.01)
- *B60W 10/10* (2012.01)

(52) U.S. Cl.
CPC ............... *B60W 20/50* (2013.01); *B60W 10/02* (2013.01); *B60W 10/08* (2013.01); *B60W 10/10* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,712,165 | B1 * | 3/2004 | Okazaki ................... | B60K 6/48 180/65.21 |
| 8,187,146 | B2 * | 5/2012 | Allgaier ................... | B60K 6/48 180/65.28 |
| 8,491,441 | B2 * | 7/2013 | Fukitani ................... | B60K 6/48 477/5 |
| 2006/0017414 | A1 * | 1/2006 | Joe et al. ......................... | 318/432 |
| 2008/0033620 | A1 * | 2/2008 | Kamichi et al. ................ | 701/59 |

FOREIGN PATENT DOCUMENTS

| | | |
|---|---|---|
| JP | 11-257472 A | 9/1999 |
| JP | 5051117 B2 | 10/2012 |
| JP | 5233652 B2 | 7/2013 |
| KR | 20100011135 A | 2/2010 |
| KR | 20120000951 A | 1/2012 |
| KR | 10-2012-0133924 A | 12/2012 |

* cited by examiner

*Primary Examiner* — Thomas Tarcza
*Assistant Examiner* — Edward Pipala
(74) *Attorney, Agent, or Firm* — Mintz Levin Cohn Ferris Glovsky and Popeo, P.C.; Peter F. Corless

(57) ABSTRACT

A control apparatus of a hybrid electric vehicle includes: a clutch provided between an engine and a motor generating power; a transmission serially connected to the motor; a driving information detector detecting driving information including an output speed of the motor, an output speed of the transmission, and a rotation speed of a driving shaft serially connected to the transmission; and a controller limiting an input torque of the motor or an input speed of the motor to a predetermined level or less when a difference between the output speed of the motor and the output speed of the transmission detected by the driving information detector is higher than a predetermined value. As a result, it is possible to prevent a hybrid electric vehicle from starting at an unwanted speed.

6 Claims, 3 Drawing Sheets

CONTROL APPARATUS AND CONTROL METHOD OF HYBRID ELECTRIC VEHICLE

CROSS-REFERENCE TO RELATED APPLICATION

This application claims under 35 U.S.C. §119(a) priority to and the benefit of Korean Patent Application No. 10-2013-0161443 filed in the Korean Intellectual Property Office on Dec. 23, 2013, the entire contents of which are incorporated herein by reference.

BACKGROUND (a) Field of the Invention

The present invention relates to a control apparatus of a hybrid electric vehicle, and a control method of the hybrid electric vehicle, which can prevent the hybrid electric vehicle from starting irrespective of an intention of a driver.

(b) Description of the Related Art

A hybrid vehicle is a vehicle that uses at least two power sources. Generally, a hybrid vehicle is operated by an engine and a motor. Various types of hybrid electric vehicles can be manufactured by using an engine and a motor.

Generally, a TMED (transmission mounted electric device) type of power train in which a motor, a transmission, and a driving shaft are serially connected is used in a hybrid electric vehicle. A clutch is provided between the engine and the motor, and the hybrid electric vehicle can be driven in an EV (electric vehicle) mode or an HEV (hybrid electric vehicle) mode according to engagement of the clutch.

When a shift stage of the hybrid electric vehicle is changed, the shift stage may be changed unexpectedly by incorrect operation of a shift lever or an unusual control signal of a TCU (transmission control unit) controlling the transmission.

Further, the vehicle may start at an unwanted speed caused by a problem of torque of the motor due to unusual input and output signals of the TCU and an HCU (hybrid control unit).

For example, there is a case in which the driver does not correctly operate the shift lever from an R range to an N range, and locates the shift lever to an intermediate position between the R range and the N range. At this time, an inhibitor switch connected to the shift lever generates an intermediate position signal and provides the intermediate position signal to the HCU.

However, the HCU misrecognizes a position of the shift lever as the R range, and generates a creep torque signal according to operation of the shift lever. The motor generates creep torque according to the creep torque signal, and thus the motor RPM is rapidly increased.

In another example, when the driver operates the shift lever from the N range to a D range, the HCU receives an input signal of the D range from the inhibitor switch, but a creep torque may be generated by the HCU in a state where the transmission is not changed to the D range. Thus the motor RPM is rapidly increased. At this time, if the transmission is changed to the D range after being delayed by a predetermined time from a time when the creep torque is generated, the vehicle starts at an unwanted speed.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a control apparatus and a control method of a hybrid electric vehicle, which can prevent the vehicle from starting at an unwanted speed due to an abnormality.

A control apparatus of a hybrid electric vehicle according to an exemplary embodiment of the present invention includes: a clutch provided between an engine and a motor generating power; a transmission serially connected to the motor; a driving information detector detecting driving information including an output speed of the motor, an output speed of the transmission, and a rotation speed of a driving shaft serially connected to the transmission; and a controller limiting torque of the motor or speed of the motor to a predetermined level or less when a difference between the output speed of the motor and the output speed of the transmission detected by the driving information detector is higher than a predetermined value.

The output speed of the transmission may be inversely calculated from the rotation speed of the driving shaft.

In a control method of a hybrid electric vehicle including an engine, a clutch, a motor, a transmission, and a driving shaft sequentially connected in series, the control method includes: detecting an output speed of the motor and an output speed of the transmission by a driving information detector of the hybrid electric vehicle; determining whether a difference between the output speed of the motor and the output speed of the transmission is higher than a predetermined value by a controller of the hybrid electric vehicle; and limiting an input torque of the motor or an input speed of the motor to a predetermined level or less when a difference between the output speed of the motor and the output speed of the transmission detected by the driving information detector is higher than a predetermined value.

The output speed of the transmission may be inversely calculated from the rotation speed of the driving shaft by the controller.

A control apparatus of a hybrid electric vehicle according to another exemplary embodiment of the present invention includes: a clutch provided between an engine and a motor generating power; a transmission serially connected to the motor; a driving information detector detecting driving information, including a shift stage of the transmission and an output speed of the motor; and a controller limiting an input torque of the motor or an input speed of the motor under a predetermined level when a difference between a torque of the motor calculated from the shift stage detected by the driving information detector and the output torque of the motor is higher than a predetermined value.

In a control method of a hybrid electric vehicle according to another exemplary embodiment of the present invention including an engine, a clutch, a motor, a transmission, and a driving shaft sequentially connected in series, the control method includes: calculating a torque of the motor corresponding to a shift stage of the transmission by a controller of the hybrid electric vehicle; determining whether a difference between the torque of the motor calculated by the controller and an output torque of the motor is higher than a predetermined value; and limiting an input torque of the motor to a predetermined level or less when the difference between the torque of the motor calculated by the controller and the output torque of the motor is higher than the predetermined value.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION OF THE EMBODIMENTS

Figure 1:
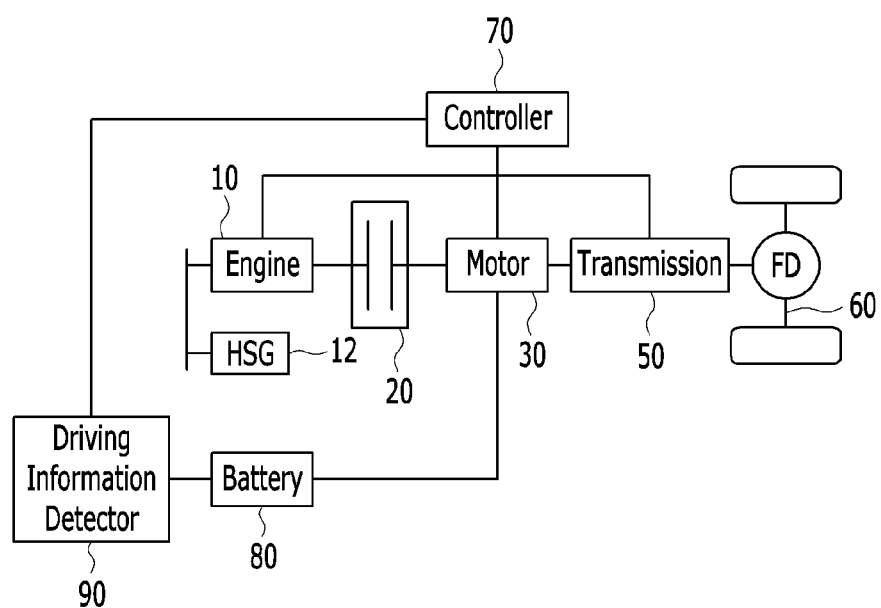
FIG. 1 is a schematic view illustrating a control apparatus of a hybrid electric vehicle according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe the present invention, portions that are not connected with the description will be omitted. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a schematic view illustrating a control apparatus of a hybrid electric vehicle according to an exemplary embodiment of the present invention.

As shown in FIG. 1, a hybrid electric vehicle according to an exemplary embodiment of the present invention includes a clutch 20 provided between an engine 10 and a motor 30 generating power, a transmission 50 serially connected to the motor 30, a driving information detector 90 detecting overall driving information of the vehicle, and a controller 70 controlling the engine 10, the motor 30, the clutch 20, and the transmission 50.

The controller 70 can be realized by one or more processors activated by a predetermined program, and the predetermined program can be programmed to perform each step of a control method of a hybrid electric vehicle according to an embodiment of the present invention.

A hybrid electric vehicle according to an exemplary embodiment of the present invention includes the engine 10, the clutch 20, the motor 30, the transmission 50, and a driving shaft 60 connected in series. This hybrid electric vehicle is referred to as a TMED hybrid electric vehicle.

The driving information detector 90 detects driving information of the vehicle including a vehicle speed, a shift stage of the transmission 50, an input speed of the transmission 50, an output speed of the transmission 50, and an output speed of the motor 30, and provides the driving information to the controller 70.

In particular, since the motor 30 and the transmission 50 are connected in series, the output speed of the motor 30 and the input speed of the transmission 50 are the same.

The controller 70 limits input torque of the motor 30 or input speed of the motor 30 to a predetermined level or less when a difference between the output speed of the motor 30 and the output speed of the transmission 50, or a difference between the input speed of the transmission 50 and the output speed of the transmission 50, is higher than a predetermined value.

In particular, the fact that the difference between the input speed of the transmission 50 and the output speed of the transmission 50 are higher than the predetermined value means that the shift stage of the transmission 30 is erroneously changed or erroneous output of the motor 30 has occurred by an abnormal signal supplied to the motor 30.

In a normal state, since the transmission 50 is serially connected to the motor 30 and the driving shaft 60, a difference between the input speed of the transmission 50 and the output speed of the transmission 50 does not occur. However, a difference between the input speed of the transmission 50 and the output speed of the transmission 50 is caused by a problem of the driving system.

In this case, a quick start of the hybrid electric vehicle can be prevented by limiting the input torque of the motor 30 or the speed of the motor 30 to the predetermined level or less.

According to another exemplary embodiment of the present invention, the controller 70 limits input torque of the motor 30 to a predetermined level or less when a difference between the torque of the motor 30 and the output torque of the motor 30 is higher than a predetermined value. In particular, the torque of the motor 30 is calculated from the shift stage detected by the driving information detector 90.

The fact that the difference between the torque of the motor 30 and the output torque of the motor 30 is higher than the predetermined value means that the shift stage of the transmission 30 is erroneously changed or an erroneous output of the motor 30 has occurred by an abnormal signal supplied to the motor 30.

In a normal state, since the transmission 50 is serially connected to the motor 30 and the driving shaft 60, a difference between the torque of the motor 30 calculated from the shift stage and the output torque of the motor does not occur. However, a difference between the input speed of the transmission 50 and the output speed of the transmission 50 is caused by a problem of the driving system.

In this case, a quick start of the hybrid electric vehicle can be prevented by limiting the torque of the motor 30 or the speed of the motor to the predetermined level or less.

Hereinafter, a control method of a hybrid electric vehicle according to an exemplary embodiment of the present invention will be described in detail.

Figure 2:
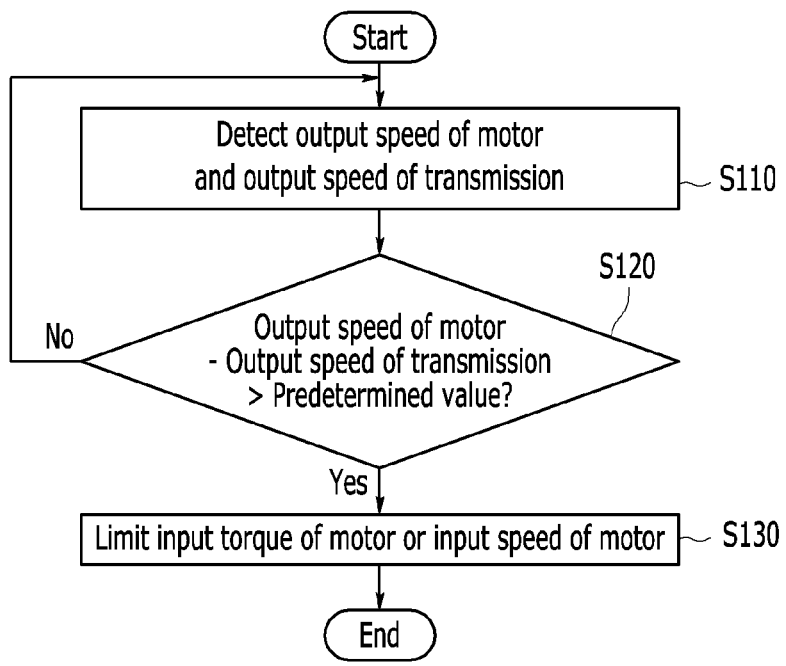
FIG. 2 is a flowchart illustrating a control method of a hybrid electric vehicle according to an exemplary embodiment of the present invention.

FIG. 2 is a flowchart illustrating a control method of a hybrid electric vehicle according to an exemplary embodiment of the present invention.

As shown in FIG. 2, the driving information detector 90 detects an output speed of the motor 30 and the output speed of the transmission 50 at step S110. The detected information is provided to the controller 70.

The controller 70 determines whether a difference between the output speed of the motor 30 and the output speed of the transmission 50 is higher than a predetermined value at step S120.

If the difference between the output speed of the motor 30 and the output speed of the transmission 50 is higher than the predetermined value, the controller 70 determines that there is a problem in a driving system, and thus the controller 70 limits the input torque of the motor 30 or the input speed the motor 30 to a predetermined level or less at step S130.

At this time, the output speed of the transmission 50 can be inversely calculated from the rotation speed of the driving shaft 60.

Figure 3:
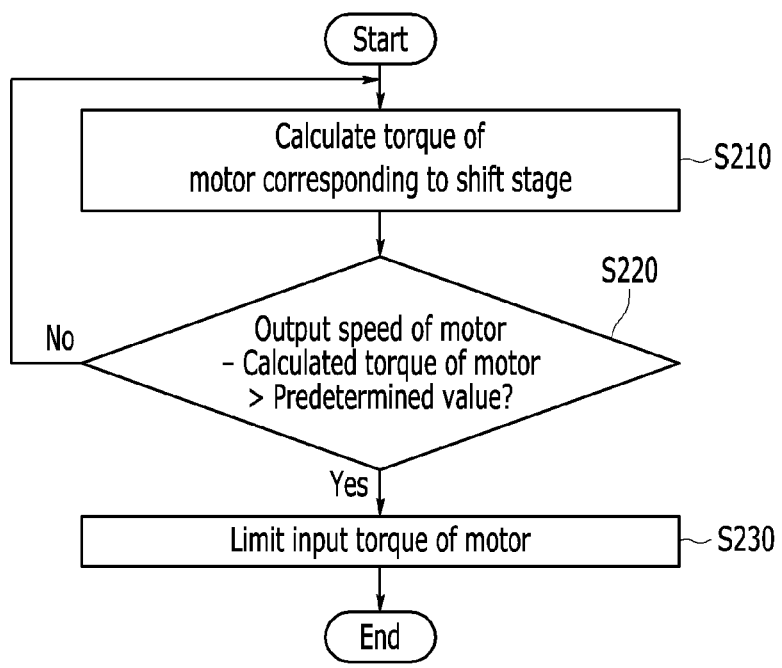
FIG. 3 is a flowchart illustrating a control method of a hybrid electric vehicle according to another exemplary embodiment of the present invention.

FIG. 3 is a flowchart illustrating a control method of hybrid electric vehicle according to another exemplary embodiment of the present invention.

As shown in FIG. 3, the controller 70 calculates a torque of the motor 30 from a shift stage of the transmission 50 at step S210.

The controller 70 then determines whether a difference between the calculated torque of the motor 30 and an output torque of the motor 30 is higher than a predetermined value at step S220.

If the difference between the calculated torque of the motor 30 and the output torque of the motor 30 is higher than the predetermined value, the controller 70 determines that there is a problem in a driving system, and thus the controller 70 limits the torque of the motor 30 or the speed the motor 30 to a predetermined level or less at step S230.

According to an exemplary embodiment of the present invention, it is possible to prevent a hybrid electric vehicle from starting at an unwanted speed.

Further, according to the present invention, it is possible to prevent a hybrid electric vehicle from quick starting due to an abnormal signal.

In addition, since a hybrid electric vehicle is prevented from quick starting due to abnormal reasons, driving safety can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control apparatus of a hybrid electric vehicle, comprising:
   a clutch provided between an engine and a motor generating power;
   a transmission serially connected to the motor;
   a driving information detector detecting driving information including an output speed of the motor, an output speed of the transmission, and a rotation speed of a driving shaft serially connected to the transmission; and
   a controller limiting torque of the motor or speed of the motor to a predetermined level or less when a difference between the output speed of the motor and the output speed of the transmission detected by the driving information detector is higher than a predetermined value.

2. The control apparatus of claim 1,
   wherein the output speed of the transmission is inversely calculated from the rotation speed of the driving shaft.

3. A control method of a hybrid electric vehicle including an engine, a clutch, a motor, a transmission, and a driving shaft sequentially connected in series, the control method comprising:
   detecting an output speed of the motor and an output speed of the transmission by a driving information detector of the hybrid electric vehicle;
   determining whether a difference between the output speed of the motor and the output speed of the transmission is higher than a predetermined value by a controller of the hybrid electric vehicle; and
   limiting an input torque of the motor or an input speed of the motor to a predetermined level or less when the difference between the output speed of the motor and the output speed of the transmission detected by the driving information detector is higher than the predetermined value.

4. The control method of claim 3,
   wherein the output speed of the transmission is inversely calculated from the rotation speed of the driving shaft by the controller.

5. A control apparatus of a hybrid electric vehicle, comprising:
   a clutch provided between an engine and a motor generating power;
   a transmission serially connected to the motor;
   a driving information detector detecting driving information, including a shift stage of the transmission and an output speed of the motor; and
   a controller limiting an input torque of the motor or an input speed of the motor under a predetermined level when a difference between a torque of the motor calculated from the shift stage detected by the driving information detector and the output torque of the motor is higher than a predetermined value.

6. A control method of a hybrid electric vehicle including an engine, a clutch, a motor, a transmission, and a driving shaft sequentially connected in series, the control method comprising:
   calculating a torque of the motor corresponding to a shift stage of the transmission by a controller of the hybrid electric vehicle;
   determining whether a difference between the torque of the motor calculated by the controller and an output torque of the motor is higher than a predetermined value; and
   limiting an input torque of the motor to a predetermined level or less when the difference between the torque of the motor calculated by the controller and the output torque of the motor is higher than the predetermined value.

* * * * *